United States Patent [19]
Shiratori et al.

[11] Patent Number: 5,648,134
[45] Date of Patent: Jul. 15, 1997

[54] THERMAL RECORDING MEDIUM CAPABLE OF KEEPING WIDTH OF MARK TRAIN CONSTANT AND RECORDING METHOD FOR THE SAME

[75] Inventors: Tsutomu Shiratori, Tokyo; Hiroshi Yoshida, Yokohama, both of Japan

[73] Assignee: Canon Kabushiki Kaisha, Tokyo, Japan

[21] Appl. No.: 450,110

[22] Filed: May 25, 1995

[30] Foreign Application Priority Data

May 26, 1994 [JP] Japan .................................. 6-112390

[51] Int. Cl.$^6$ ........................................................ B32B 3/00
[52] U.S. Cl. ...................... 428/641; 428/64.3; 428/64.4; 428/65.3; 428/65.6; 428/694 R; 428/694 ML; 428/913; 430/270.12; 430/270.13; 430/490.1; 430/945; 369/275.1; 369/283; 369/288
[58] Field of Search ................... 428/64.1, 64.2, 428/64.3, 64.4, 65.3, 65.6, 694 R, 694 ML, 913; 430/270.1, 270.11, 270.12, 270.13, 495, 945; 369/275.1, 283, 288

[56] References Cited

U.S. PATENT DOCUMENTS

| | | | |
|---|---|---|---|
| 4,839,226 | 6/1989 | Sawada et al. | 428/336 |
| 4,985,885 | 1/1991 | Ohta et al. | 369/275.1 |
| 5,087,340 | 2/1992 | Onagi et al. | 204/192.2 |
| 5,498,485 | 3/1996 | Nakayama et al. | 428/694 ML |

FOREIGN PATENT DOCUMENTS

0339875  11/1989  European Pat. Off. .

Primary Examiner—Newton Edwards
Assistant Examiner—Elizabeth Evans
Attorney, Agent, or Firm—Fitzpatrick, Cella, Harper & Scinto

[57] ABSTRACT

Recording or erasing on a thermal recording medium is performed such a manner that a local region of a recording film on the recording medium is heated to a predetermined temperature to reversibly change the state of the local region between two states. In this method, the recording film is initialized in one of the two states. When the recording film is set in the other of the two states upon continuous or intermittent heating, a band-like region elongated in a recording direction on the recording film is formed to effect the erasing operation. In recording step, the local region of the recording film is heated to a predetermined temperature in accordance with information so as to include the band-like region in the local region to be heated and a state of the heated local region is caused to be identical with the state upon the initialization.

3 Claims, 7 Drawing Sheets

DOMAIN SHAPE

F I G. 6

DOMAIN SHAPE

THERMAL RECORDING MEDIUM CAPABLE OF KEEPING WIDTH OF MARK TRAIN CONSTANT AND RECORDING METHOD FOR THE SAME

BACKGROUND OF THE INVENTION

1. Field of the Invention

The present invention relates to a thermal recording medium in which a local region of a recording layer is heated to a predetermined temperature to change the state of the local region (this operation will be referred to as a heat mode hereinafter) so that information is recorded or erased and, more particularly, to an optical recording medium capable of recording information by irradiation of a light beam and a method of recording information thereon.

2. Related Background Art

Various media have been proposed as thermal recording media capable of recording information in the heat mode. In particular, an optical recording medium capable of performing optical detection to record information as a change in the optical state of the medium upon laser beam irradiation and heating can record information at a high density. This optical recording medium is used as an optical disk or card in practice.

A change in optical state on an optical recording medium is exemplified in the forms of a recessed pit, the presence/absence or deformation of a reflecting film, a change in refractive index, magnetic reversal, and the like. Among them all, magnetic reversal is detected as a change in the polarized state of reflected light. In another form, a change in the optical state is detected as a change in amount of reflected light or the like.

In recording information on an optical recording medium and reproducing it from the medium, marks formed by changes in optical states are formed and recorded as a mark train corresponding to information, and this mark train is read time-serially by a predetermined operation, thereby reproducing the information.

Figure 1:
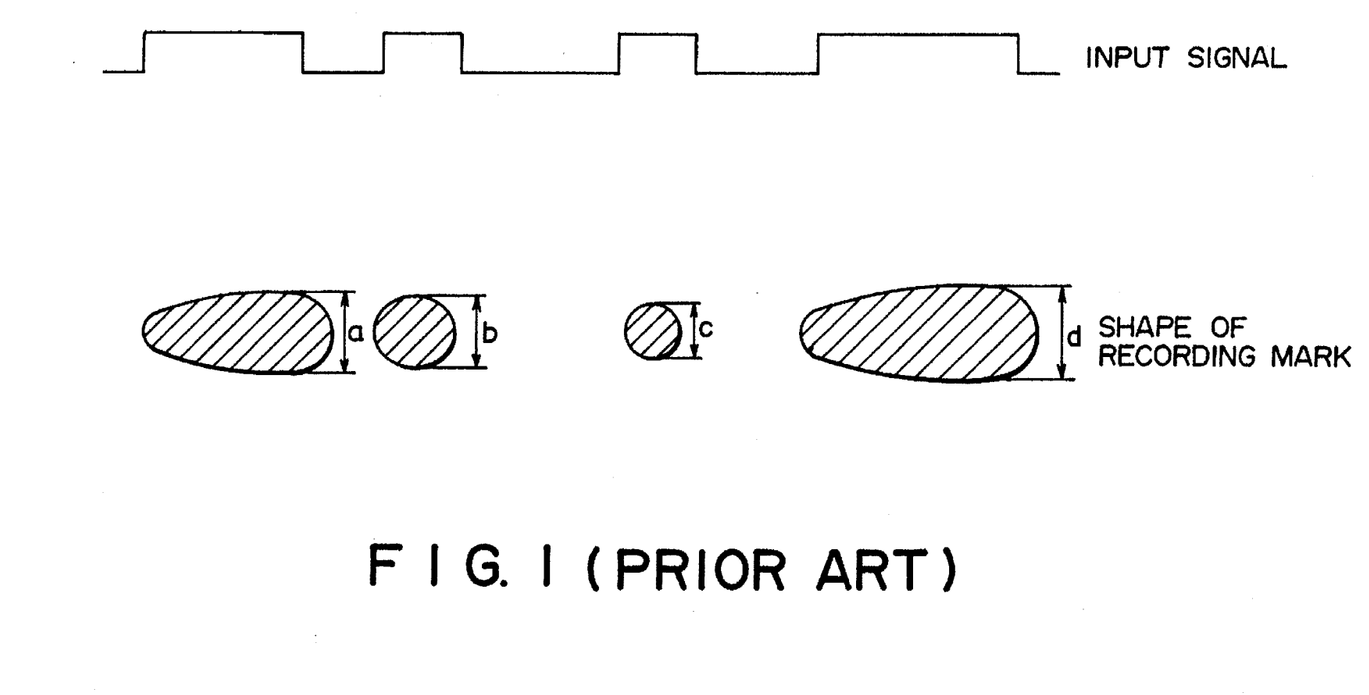
FIG. 1 is a view illustrating the relationship between the input signal and the recording marks using a conventional technique.

In this recording of the heat mode, the size and shape of a mark to be formed are determined by a temperature distribution induced on a recording film upon local heating. The temperature distribution induced on the recording film is influenced by thermal diffusion in the planar direction of the film. For this reason, even if a heating region is shifted at a constant linear speed while the incident energy per unit time is kept constant, the temperature distribution to be formed changes in a complicated fashion, depending on the moving distance (length of a mark) and the distance from an immediately preceding heated region. FIG. 1 is a view showing the relationship between the input signal and the marks in a conventional recording technique. As shown in FIG. 1, when a recording layer is simply heated in correspondence with information in the conventional recording technique, the widths (vertical dimensions in FIG. 1, $d>a>b>c$) of the formed marks vary depending on the information pattern. When such a mark train is read time-serially by light beam scanning, the mark read timings fluctuate depending on the mark pattern. As a result, original information may not be accurately reproduced.

To solve this problem, various recording compensation schemes for adjusting the incident energy per unit time, heating time, and the like in accordance with the information pattern are proposed. However, these recording compensation schemes undesirably complicate the recording means.

SUMMARY OF THE INVENTION

The present invention has been made in consideration of the conventional problems described above, has as its object to provide a thermal recording medium and its recording method which are capable of keeping the width of a target mark train constant regardless of the information pattern to reduce the reproduction defect rate (to be referred to as the reproduction error rate hereinafter) even if recording in a heat mode is performed in accordance with a simple recording scheme.

In order to achieve the above object according to an aspect of the present invention, there is provided a thermal recording medium having a recording or erasing region which undergoes a change in state upon heating, wherein the recording or erasing region is formed in a band-like shape elongated in a recording direction.

In order to achieve the above object according to another aspect of the present invention, there is provided a recording method for a thermal recording medium, in which a local region of a recording film is heated to a predetermined temperature to reversibly change the state of the local region between two states, thereby recording or erasing information, comprising:

the initialization step of initializing the recording film in one of the two states;

the erasing step of forming a band-like region elongated in a recording direction on the recording film when the recording film is set in the other of the two states upon continuous or intermittent heating; and the recording step of heating the local region of the recording film to a predetermined temperature in accordance with information so as to include the band-like region in the local region to be heated and setting a state of the heated local region to be identical to the state of the initialization step.

The above and other objects, features, and advantages of the present invention will be described with reference to the detailed description of the preferred embodiments taken in conjunction with the accompanying drawings.

DETAILED DESCRIPTION OF THE PREFERRED EMBODIMENTS

Figure 2A:
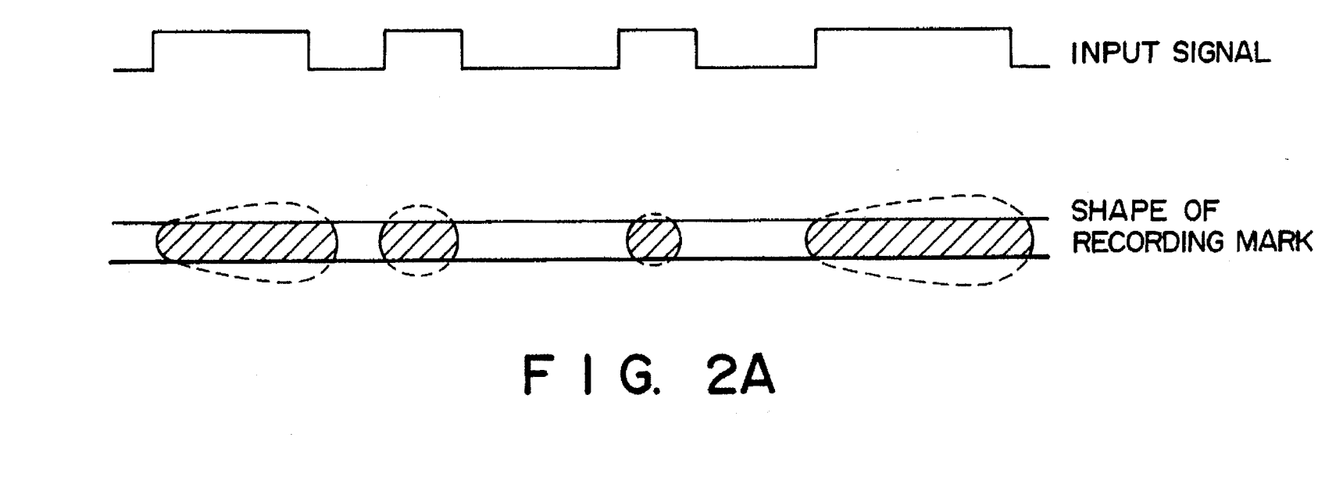
FIGS. 2A and 2B are views illustrating the relationships between the input signal and the recording marks according to the present invention.
Figure 2B:
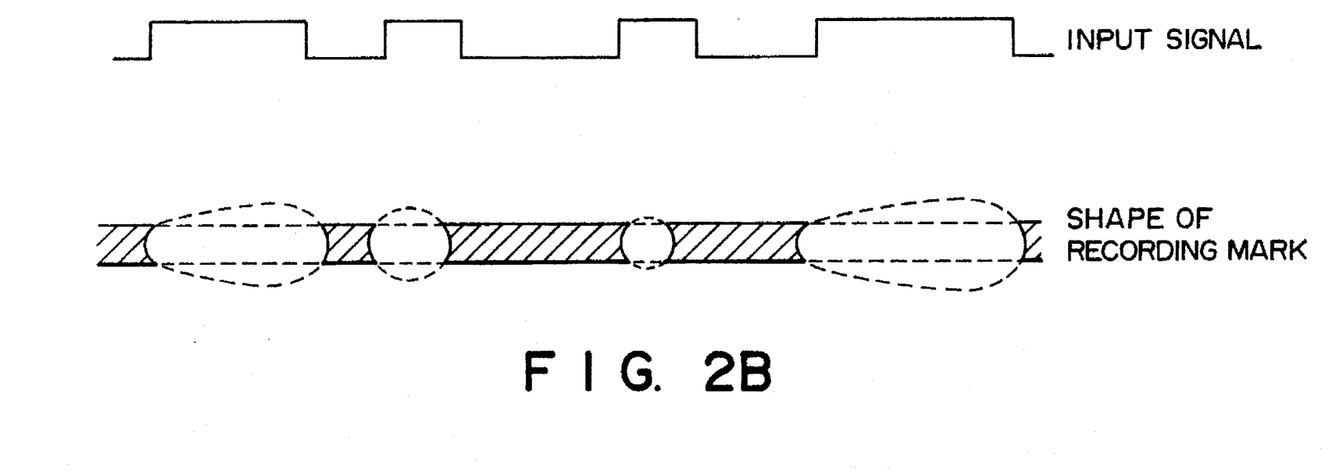

FIGS. 2A and 2B are views illustrating the relationships between the input signal and the marks formed on a thermal recording medium according to the present invention. FIG. 2A is a view for explaining the recording medium of the present invention, while FIG. 2B is a view for explaining a recording method of the present invention. According to the thermal recording medium of the present invention, a region capable of recording is set as a band-like region having a predetermined width. For this reason, even if recording is performed upon heating simply corresponding to information, a mark train having a predetermined vertical dimension (width) can be formed regardless of the information pattern, as shown in FIG. 2A.

According to the recording method of the present invention, a band-like region having a predetermined width is formed in an information erasing operation, while the band-like region is partially erased in accordance with information in an information recording operation. Therefore, marks formed upon recording are residual portions of the band-like region, as shown in FIG. 2B, thereby keeping the width of the mark train constant.

As a method of forming a band-like region capable of recording and having a predetermined width, a method of performing laser annealing or the like to change the two side portions of the band-like region into a state incapable of recording or an etching method upon patterning is available.

The present invention will be described in detail by way of its examples below.

First of all, a magnetooptical recording medium to which the present invention will be described below.

Figure 3:
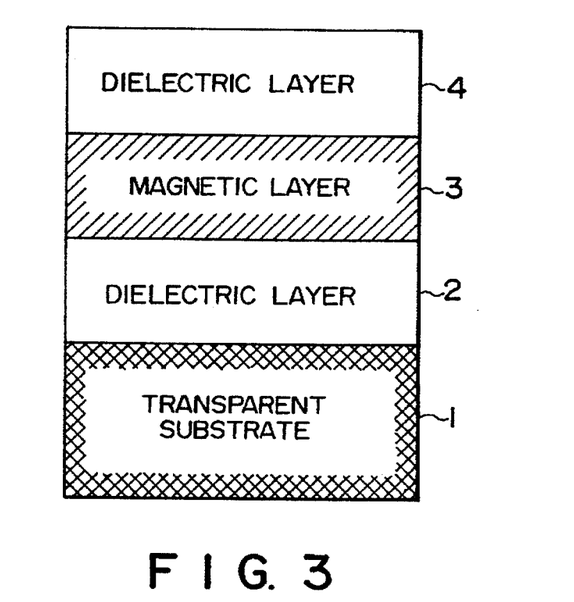
FIG. 3 is a sectional view illustrating the structure of a magnetooptical recording medium according to the present invention.

FIG. 3 is a schematic sectional view showing the structure of a magnetooptical recording medium according to the present invention. A magnetic layer 3 is formed on a transparent substrate 1 consisting of polycarbonate or glass through a dielectric layer 2, and a dielectric layer 4 serving as a protective film is formed on the magnetic layer 3. Each layer can be formed by, e.g., continuous deposition or continuous sputtering using a magnetron sputtering apparatus.

In the above medium, various magnetic materials can be used to form the magnetic layer. For example, the magnetic layer can consist of a rare earth-iron group amorphous alloy having 10 to 50% of at least one rare earth element selected from Pr, Nd, Sm, Gd, Tb, Dy, and Ho, and 90 to 50% of at least one iron group element selected from Fe, Co, and Ni. An element such as Cr, Mn, Cu, Ti, Al, Si, Pt, or In may be added to the above composition in a small amount to improve the corrosion resistance thereof.

The saturation magnetization of each magnetic layer can be controlled by the composition ratio of the rare earth element to the iron group element. The coercive force can be controlled by the adjustment of saturation magnetization. However, essentially, proper material elements are selected to adjust the perpendicular magnetization anisotropy, thereby controlling the coercive force. Tb- and Dy-based materials generally have a high perpendicular magnetization anisotropy and a large coercive force, while a Gd-based material has a low anisotropy and a small coercive force. The perpendicular magnetization anisotropy is reduced when a nonmagnetic element is added.

The Curie temperature can also be controlled by the composition ratio. However, to control the Curie temperature independently of the saturation magnetization, a material obtained by partially substituting Fe with Co is used, and a method of controlling this substitution amount is preferably used. More specifically, for every one % of Fe that is substituted by Co an increase of about 6° C. in Curie temperature is expected. By using this relationship, the Co content is adjusted to obtain a desired Curie temperature. A nonmagnetic layer element such as Cr or Ti can be added in a very small amount to decrease the Curie temperature. Alternatively, two or more rare earth elements are added and their composition ratio is adjusted, thereby controlling the Curie temperature.

The thickness of each layer is controlled by adjusting the film formation time.

EXAMPLE 1

B-doped Si, and Tb, Fe, and Co targets were mounted in a DC magnetron sputtering apparatus, a disk-like polycarbonate substrate having a plurality of helical or concentric tracks constituted by lands and grooves was fixed on a substrate holder, and the apparatus was evacuated by a cryopump to a high vacuum of $1\times10^{-5}$ Pa or less.

Ar gas was supplied to the chamber kept in the high vacuum until the pressure became 0.3 Pa. A 70-nm thick SiN layer was formed as a dielectric layer while the substrate was being rotated. Subsequently, an 80-nm TbFeCo layer was formed as a magnetic layer, and finally a 50-nm thick SiN layer was formed as a protective layer.

The resultant disk was unloaded from the vacuum chamber, and a UV resin was coated on the film surface.

The composition ratio of the rare earth element to the iron group element in the TbFeCo layer serving as the magnetic layer was adjusted such that the sublattice magnetization of the iron group element was dominant at room temperature and the coercive force was about 10 kOe. The Co content was adjusted to set the Curie temperature at about 150° C.

In SiN layer formation, $N_2$ gas was supplied in addition to Ar gas, and the SiN layer was formed by DC reactive sputtering. The magnetic layer was formed by applying a DC power to each of the Tb, Fe, and Co targets, and its composition was controlled by adjusting the power ratio.

A magnetic field of 15 kOe was applied downward to this disk to entirely magnetize (initialize) the magnetic layer downward. The disk was set in a drive unit having a laser wavelength of 780 nm and an optical head having an objective lens NA (numerical aperture) of 0.55. The disk was rotated at a predetermined frequency of 50 Hz, and the recording characteristics were measured at a 30-mm position in the radial direction. The bias magnetic field Hb in the recording and erasing modes was set to 300 Oe. In the erasing mode, a DC laser beam was irradiated on the disk while an upward bias magnetic field was being applied to the disk. In the recording mode, a laser was driven in correspondence with information while a downward bias magnetic field was being applied to the disk.

Figure 4:
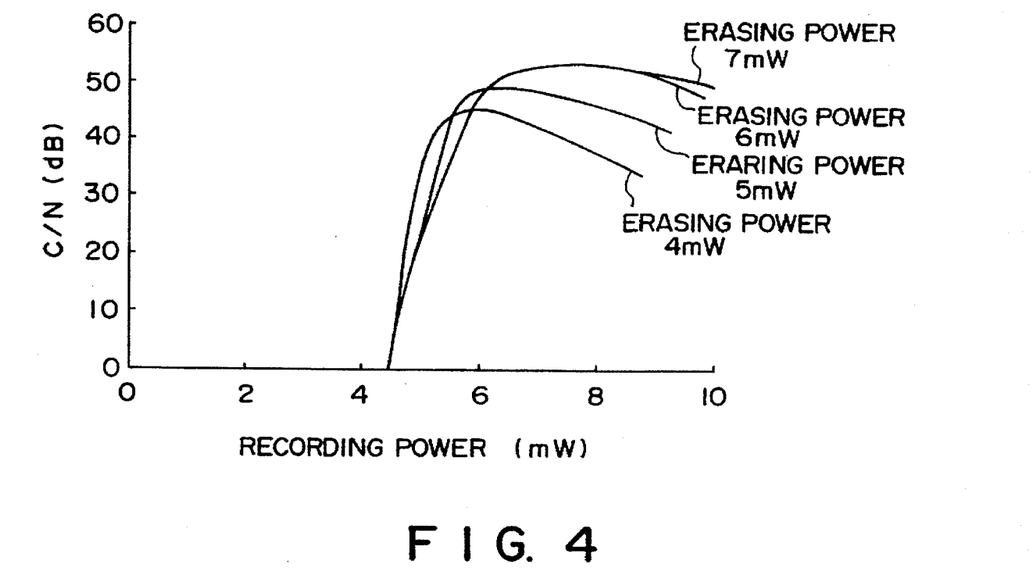
FIG. 4 is a graph showing the relationship between the recording power and the C/N ratio at each erasing power.

To obtain appropriate erasing and recording powers first, pieces of information were erased at erasing powers of 4 mW, 5 mW, 6 mW, and 7 mW, respectively, and a laser was driven at a frequency of 6.25 MHz and a duty ratio of 25% to record information, thereby measuring the recording power dependency of the C/N ratio. The obtained results are shown in FIG. 4.

After a band-like erasing region was formed along tracks subjected to recording, using a continuous or intermittent laser beam having an erasing power of 6 mW and an upward bias magnetic field, (1–7)RLL random data was mark-edge-recorded on the erasing region using a laser beam having a recording power of 7.5 mW and a downward bias magnetic field. Note that the width of the region of the magnetic layer, which was heated by this recording power, in a direction perpendicular to the track was larger than the width of the erasing region. The laser drive waveform was given such that a laser pulse having a width of (n−1)T with respect to a signal having a width of nT was irradiated the medium with a rise delay of 1 T from the input signal. The clock frequency was set to 25 MHz, and the shortest mark length was set to 0.75 μm.

Figure 5:
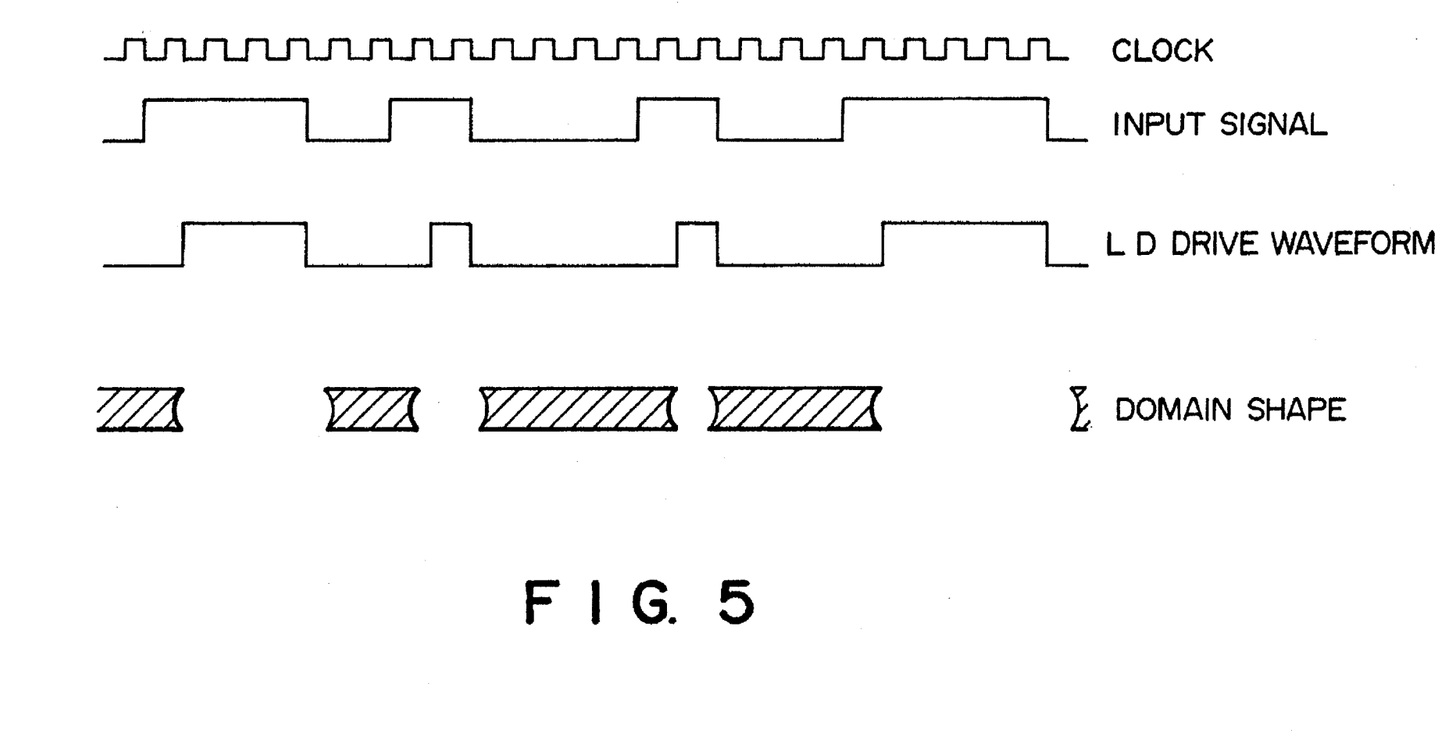
FIG. 5 is a view illustrating the relationship between the input signal, the LD drive waveform, and the domain shape in a thermal recording medium according to Example 1.

This random data was reproduced at a reproduction power of 1.5 mW, and the waveform of the resultant analog signal was sliced and binarized at the DC level. The interval between the leading edges of the resultant digital signal was measured. $10^5$ samples for all the data patterns were sampled to obtain a relative jitter distribution. The jitter margin was 40% of the detection window width (40 nsec), and practically satisfactory reproduction characteristics were obtained. At this time, the magnetic domains were observed with a polarizing microscope. The results are shown in FIG. 5 together with the input signal and the laser drive waveform. FIG. 5 shows that marks having a predetermined vertical width are formed.

In Example 1, a recording method has been described on the assumption that a disk has a magnetic recording layer having no compensation temperature in a temperature range of room temperature or more and the Curie temperature or less. When a disk having a magnetic recording layer having a compensation temperature within the above range is used, the direction of the erasing bias magnetic field is set to coincide with the direction of initial magnetization of the entire surface of the disk, and the direction of the recording bias magnetic field is set opposite thereto.

Comparative Example 1

A magnetic field of 15 kOe was applied upward to a disk identical to that in Example 1 to entirely magnetize (initialize) the magnetic layer upward. The disk was set in a drive unit having a laser wavelength of 780 nm and an optical head having an objective lens NA (numerical aperture) of 0.55. The disk was rotated at a predetermined frequency of 50 Hz, and the recording characteristics were measured at a 30-mm position in the radial direction. The bias magnetic field Hb in the recording and erasing modes was set to 300 Oe. In the erasing mode, a DC laser beam was irradiated on the disk while an upward bias magnetic field was being applied to the disk. In the recording mode, a laser was driven in correspondence with information while a downward bias magnetic field was being applied to the disk.

Following the same procedures as in Example 1, a laser was driven at a frequency of 6.25 MHz and a duty ratio of 25% to record information, and the optimal recording power was found to be 7.5 mW. (1–7)RLL random data was mark-edge-recorded at this power following the same procedures as in Example 1.

When this recording pattern was reproduced following the same procedures as in Example 1, the jitter margin was 10% or less of the detection window width (40 nsec). The error rate was large, and practically satisfactory reproduction characteristics could not be obtained.

Figure 6:
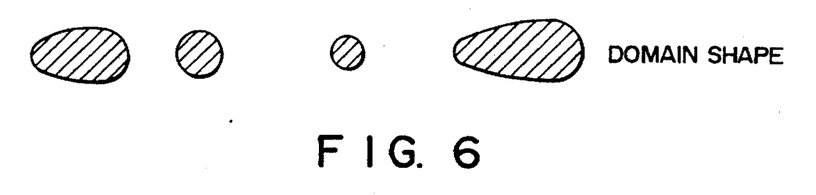
FIG. 6 is a view illustrating a domain shape recorded by a method of Comparative Example 1.

The magnetic domains of the medium were observed with a polarizing microscope. The results are shown in FIG. 6. FIG. 6 shows that the vertical dimensions of the formed marks are nonuniform.

Comparative Example 2

(1–7)RLL random data was mark-edge-recorded following the same procedures as in Example 1 except that the erasing power was changed to 12 mW.

When this recording pattern was reproduced following the same procedures as in Example 1, the jitter margin was 10% or less of the detection window width (40 nsec). The error rate was large, and practically satisfactory reproduction characteristics could not be obtained.

Figure 7:
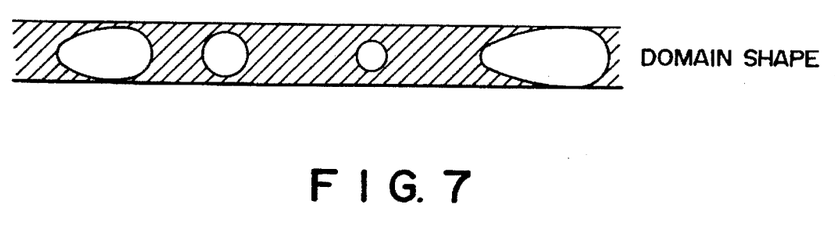
FIG. 7 is a view illustrating a domain shape recorded by a method of Comparative Example 2.

The magnetic domains of the medium were observed with a polarizing microscope. The results are shown in FIG. 7. FIG. 7 shows that the vertical dimensions of the formed marks (hollow portions in FIG. 7) vary because the width of a region reversed by the erasing power is smaller than the width of a region reversed by the recording power.

EXAMPLE 2

A DC laser having a power of 12 mW was irradiated on the entire surface of a disk identical to that of Example 1 at a linear speed of 1.0 m/sec while the groove of the disk was servo-controlled. By this operation, a recording film near the groove was heated to 400° C. or more, and the heated portion structurally changed to be incapable of recording. A band-like portion having a width of about 0.6 μm between the grooves was left as a region capable of recording.

After (1–7)RLL random data was mark-edge-recorded on this disk at a recording power of 7.5 mW, following the same procedures as in Example 1, the information was reproduced following the same procedures as in Example 1. The jitter margin was 35% of the detection window width (40 nsec), and practically satisfactory reproduction characteristics were obtained.

Figure 8:
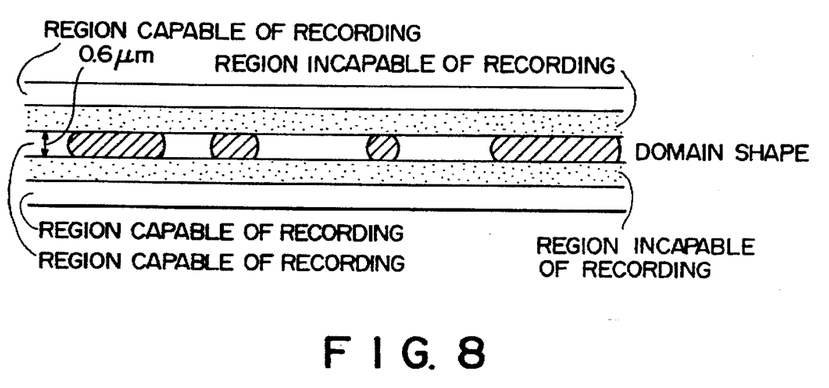
FIG. 8 is a view illustrating the state of a recording film formed by a method of Example 2 and a domain shape formed in a band-like region capable of recording.

The magnetic domains of the medium were observed with a polarizing microscope. The results are shown in FIG. 8. FIG. 8 shows that a region incapable of recording is formed around the band-like region capable of recording and having a width of 0.6 μm.

In this embodiment, the recording film near the groove is rendered incapable of recording. Conversely, a recording film near a land portion may be rendered incapable of recording while a band-like portion between the land portions may be left as a region capable of recording.

Examples in which the present invention is applied to a phase change type recording medium and other writing once type recording media will be described below.

EXAMPLE 3

An 150-nm thick $ZnS-SiO_2$ mixed layer, a 20-nm thick GeSbTe layer, a 15-nm thick $ZnS-SiO_2$ layer, and a 50-nm thick Au layer were sequentially formed on a substrate by a DC magnetron sputtering method. The resultant disk was annealed such that the GeSbTe phase change recording layer was entirely set in the crystalline state.

The disk was set in a drive unit having a laser wavelength of 780 nm and an optical head having an objective lens NA (numerical aperture) of 0.55. The disk was rotated at a predetermined frequency of 50 Hz, and the recording characteristics were measured at a 30-mm position in the radial direction.

When a DC laser having a power of 14 mW was irradiated, a band-like amorphous region having a width of about 0.8 μm was formed. Subsequently, a laser having a power of 10 mW was driven to irradiate the laser beam on this band-like region at a frequency of 6.25 MHz and a duty ratio of 25%. The irradiated portion crystallized again to periodically divide the band-like region.

(1–7)RLL random data was mark-edge-recorded at an erasing power of 14 mW and a recording power of 10 mW. The laser drive waveform was given such that a laser pulse having a width of (n−1)T with respect to a signal having a width nT was irradiated with a rise delay of 1 T from the input signal. The clock frequency was set to 25 MHz, and the shortest mark length was set to 0.75 μm.

This random data was reproduced at a reproduction power of 1.5 mW, and the waveform of the resultant analog signal was sliced and binarized at the DC level. The interval between the leading edges of the resultant digital signal was measured. $10^5$ samples for all the data patterns were sampled to obtain a relative jitter distribution. The jitter margin was 40% of the detection window width (40 nsec), and practically satisfactory reproduction characteristics were obtained.

Comparative Example 3

A laser having a power of 18 mW was driven to irradiate a laser beam on a region in the crystalline state which was identical to that of Example 3 at a frequency of 6.25 MHz and a duty ratio of 25%. The irradiated portion became amorphous, and periodic marks were formed.

(1–7)RLL random data was mark-edge-recorded following the same procedures as in Example 3 at this recording power. When this recording pattern was reproduced following the same procedures as in Example 3, the jitter margin was 10% or less of the detection window width (40 nsec). The error rate was large, and practically satisfactory reproduction characteristics could not be obtained.

EXAMPLE 4

A writing once type recording film of an organic dye system was spin-coated on a substrate having tracks constituted by grooves and lands.

A DC laser irradiated on this disk while the grooves were servo-controlled, so that a recording film near the groove was rendered to be in a recording state to thereby be incapable of further writing. Only the land portion was left as a region capable of recording.

When recording is performed such that a region having a width larger than the width of the region of capable of recording is heated to a recording temperature, marks having a predetermined width can always be formed regardless of a recording pattern, thereby obtaining a good reproduced signal.

In this embodiment, the recording film near the groove was rendered to be in a recording state beforehand. A measure converse to this embodiment may be applied such that a recording film near a land portion is rendered to be in a recording state beforehand while only a groove portion is left as a region capable of recording.

EXAMPLE 5

The recording method of the present invention is also applicable to a magnetooptical recording medium capable of performing an overwrite operation by optical modulation.

A 80-nm thick silicon nitride layer was formed by a sputtering method on a disk-like substrate having a diameter of 130 mm, spiral tracks, and a preformat. In this case, the tracks had a pitch of 1.6 μm, a land width of 1.0 μm, and a groove width of 0.6 μm. Five types of magnetic layers, i.e., magnetic layer 1 to magnetic layer 5 in Table 1 were sequentially stacked on the silicon nitride layer in a vacuum state.

TABLE 1

| | Material · Composition | h (nm) | Tc (°C.) | Ms (emu/cm³) | Hc (Oe) | $\sigma_w$ (erg/cm³) |
|---|---|---|---|---|---|---|
| Magnetic Layer 1 | $Tb_{22}(FeCo_{10})$ | 30 | 180 | 50 | >20k | |
| Magnetic Layer 2 | $Gd_{35}(FeCo_{35})$ | 20 | 200 | 300 | — | $\sigma_{w13} = 0.5$ |
| Magnetic Layer 3 | $Dy_{21}(FeCo_{30})$ | 20 | 250 | 100 | 10k | |
| Magnetic Layer 4 | $Tb_{20}(FeCo_8)$ | 5 | 160 | 100 | 12k | $\sigma_{w35} = 6.0$ |
| Magnetic Layer 5 | $Tb_{20}Co$ | 30 | >300 | 150 | 10k | |

(Notes)
h: film thickness
Tc: Curie temperature
Ms: saturation magnetization
Hc: coercive force
$\sigma_w$: interface magnetic wall energy density
(Ms, Hc, and $\sigma_w$ are values at room temperature)

A 60-nm thick silicon nitride layer was formed to prepare a magnetooptical disk capable of an overwrite operation by optical modulation. A magnetic field of about 15 kOe was applied to the entire surface of the disk to set the direction of magnetization of magnetic layer 5 in the upward direction perpendicular to the film surface.

A magnetized state in which an interface magnetic wall is present and a magnetized state in which an interface magnetic wall is absent can be arbitrarily set in correspondence with recording operations for heating and cooling the disk to two different temperature states under the application of a predetermined external magnetic field. At least one of the plurality of magnetic layers of the magnetooptical recording medium is always kept in a predetermined aligned state even upon the recording operations.

Figure 9:
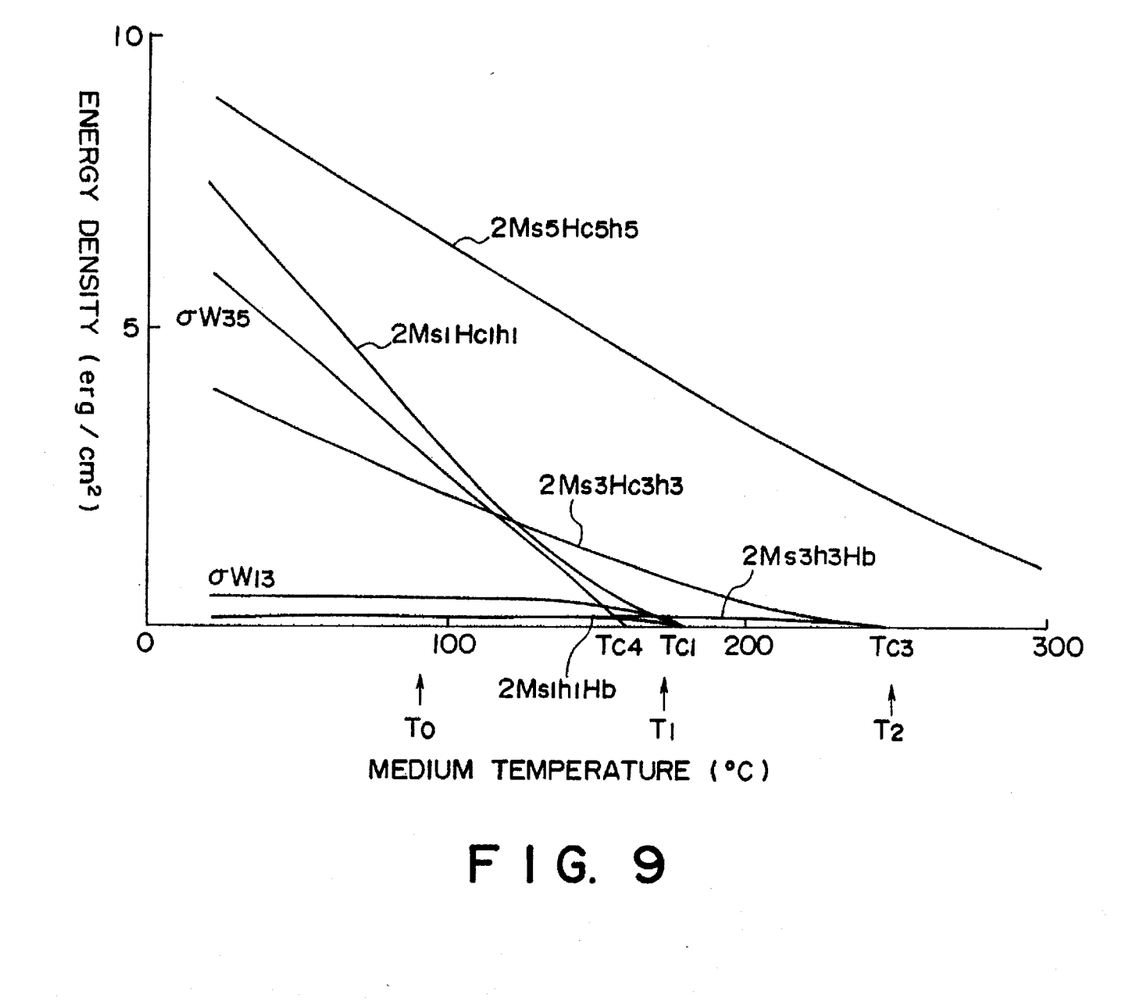
FIG. 9 is a graph showing the relationship between the medium temperature and the magnetic energy density of each layer when a downward external magnetic field Hb of 300 Oe is applied in Example 5.

In the following description, assume that the saturation magnetization, the coercive force and the film thickness of an ith magnetic layer, and the magnetic wall energy density of the interface between the ith magnetic layer and a jth magnetic layer are defined as $Ms_i$, $Hc_i$, $h_i$, and $\sigma_{wij}$, respectively. Note that the signs in the following inequalities have the same order. FIG. 9 shows the temperature dependency of the magnetic energy density of each layer of this disk when the predetermined external magnetic field applied to this disk is a downward magnetic field Hb of 300 Oe. The following facts are found from FIG. 9.

More specifically, at the ambient temperature, magnetic layer 3 is magnetized upward (i.e., the atomic spins of the iron group element are upward because the sublattice magnetization of the iron group element is dominant) since $2Ms_3Hc_3h_3 > 2Ms_3h_3Hb \pm \sigma_{w13} - \sigma_{w35}$. Magnetic layer 1 is magnetized in an arbitrary direction independently of the direction of magnetization of magnetic layer 3 since $2Ms_1Hc_1h_1 > \pm 2Ms_1h_1Hb \pm \sigma_{w13}$.

In the temperature elevating process, when the medium temperature reaches a temperature $T_1$ (up to 180° C.) near the Curie temperature of magnetic layer 1, $2Ms_1Hc_1h_1 < -2Ms_1h_1Hb + \sigma_{w13}$ is obtained. Since $2Ms_3Hc_3h_3 > 2Ms_3h_3Hb \pm \sigma_{w13} - \sigma_{w35}$ continues to hold magnetic layer 1 is magnetized in a state wherein coupling by an exchange force is stable, following the magnetized state of magnetic layer 3.

In the temperature elevating process, when the medium temperature reaches a temperature $T_2$ (up to 250° C.) near the Curie temperature of magnetic layer 3, $2Ms_3Hc_3h_3 < 2Ms_3h_3Hb - \sigma_{w13} - \sigma_{w35}$ is established. The direction of magnetization of magnetic layer 3 is reversed downward.

In the cooling process upon heating the medium to a temperature higher than $T_2$, when the medium temperature reaches a temperature $T_0$ (up to 100° C.) equal to or lower than the Curie temperature of magnetic layer 4, $\sigma_{w35}$ increases to establish $2Ms_3Hc_3h_3 < -2Ms_3h_3Hb - \sigma_{w13} + \sigma_{w35}$, so that $2Ms_5Hc_5h_5 > 2Ms_5h_5Hb + \sigma_{w35}$ holds in the entire temperature process. Magnetic layer 3 is reversed upward again while magnetic layer 5 maintains the initial state. At this time, $2Ms_1Hc_1h_1 > \pm 2Ms_1h_1Hb \pm \sigma_{w13}$ is established, so that magnetic layer 1 maintains the immediately preceding magnetized state independently of magnetic layer 3.

When the medium is cooled without being heated to $T_2$, $2Ms_3Hc_3h_3 > 2Ms_3h_3Hb \pm \sigma_{w13} - \sigma_{w35}$ is established. For this reason, the magnetized state of magnetic layer 3 does not change but remains upward.

As a result, regardless of the presence/absence of a magnetic wall in the initial magnetized state, a magnetized state in which interface magnetic walls are absent between the respective layers can be formed in accordance with heating and cooling operations to the first temperature state at which the medium temperature reaches the temperature $T_1$ close to the Curie temperature of magnetic layer 1. A magnetized state in which an interface magnetic wall is present between magnetic layers 1 and 3 can be formed in accordance with heating and cooling operations to the second temperature state in which the medium temperature reaches the temperature $T_2$ close to the Curie temperature of magnetic layer 3. Magnetic layer 5 always maintains the initial magnetized state in all the heating and cooling processes to the two temperature states described above.

Figure 10:
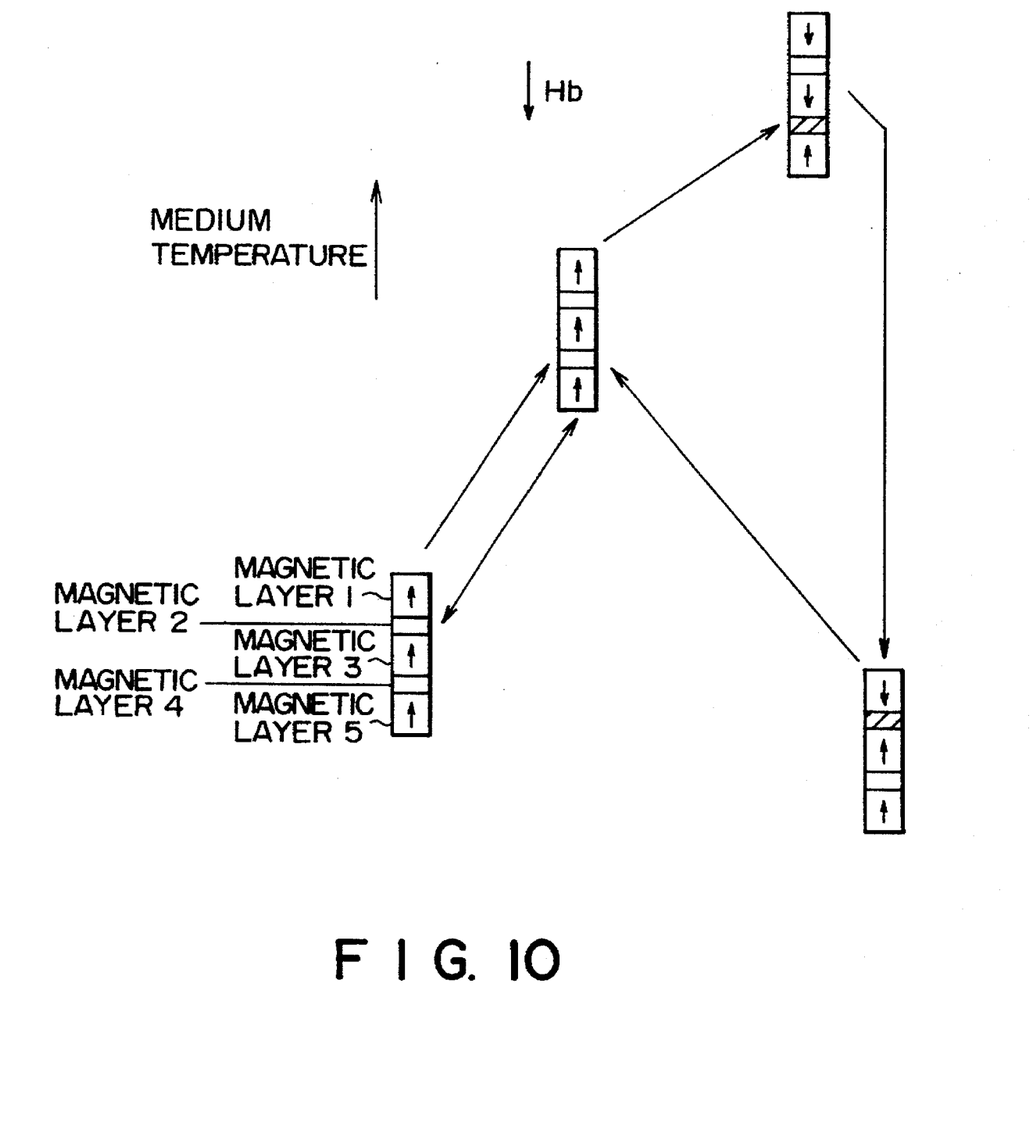
FIG. 10 is a view illustrating a transition process of a magnetized state corresponding to a change in temperature of a thermal recording medium of Example 5.

In the above description, the coercive force energies and Zeiman energies of magnetic layers 2 and 4 are neglected because they have small influences on the magnetization behaviors. The Bloch magnetic wall energies and diamagnetic energies are also neglected due to the same reason as described above. The transition process of the magnetized states respectively corresponding to changes in medium temperature are shown in FIG. 10. Note that magnetic layers 2 and 4 are magnetic interlayers to set $\sigma_{w13}$ and $\sigma_{35}$ to have magnitudes and temperature dependencies shown in FIG. 9. For this purpose, preferably, the Curie temperature of magnetic layer 2 is about $T_{c1}$ or more ($T_{c1}$ is the Curie temperature of magnetic layer 1), and a material whose magnetic wall energy is as low as possible is selected for magnetic layer 2. Preferably, the Curie temperature of magnetic layer 4 is about $T_{c1}$ or less, and a material whose magnetic wall energy is as high as possible is selected for magnetic layer 4.

The disk was set in a drive unit having a laser wavelength of 780 nm and an optical head having an objective lens NA (numerical aperture) of 0.55. The disk was rotated at a predetermined period of 50 Hz, and the recording characteristics were measured at a 30-mm position in the radial direction. The bias magnetic field Hb in the recording and erasing modes was set to 300 Oe. In the erasing mode, a DC laser beam was irradiated on the disk while a downward bias magnetic field was being applied to the disk. In the recording mode, a laser was driven in correspondence with information while an upward bias magnetic field was being applied to the disk.

Prior to the measurement, a 10-mW DC laser beam was irradiated on the entire land and group portions while a magnetic field of 300 Oe was applied upward to the disk, thereby aligning the direction of atomic spins of the iron group element of each magnetic layer with the upward direction of magnetic layer 5.

An 8.5-mW DC laser beam was irradiated on the disk while a downward bias magnetic field was kept applied thereto, thereby forming a magnetic wall in a band-like region having a width of about 0.75 μm. A 7-mW laser was driven at a frequency of 6.25 MHz and a duty ratio of 25% to irradiate a laser beam on the band-like region. In the irradiated portion, the direction of magnetization of a region capable of recording was reversed, and the magnetic wall disappeared. Therefore, the band-like region was periodically divided.

(1-7)RLL random data was mark-edge-recorded at an erasing power of 8.5 mW and a recording power of 7 mW. The laser drive waveform is given such that a laser pulse having a width of (n-1)T with respect to a signal having a width nT was irradiated with a rise delay of 1 T from the input signal. The clock frequency was set to 25 MHz, and the shortest mark length was set to 0.75 μm.

This random data was reproduced at a reproduction power of 1.5 mW, and the waveform of the resultant analog signal was sliced and binarized at the DC level. The interval between the leading edges of the resultant digital signal was measured. $10^5$ samples for all the data patterns were sampled to obtain a relative jitter distribution. The jitter margin was 40% of the detection window width (40 nsec), and practically satisfactory reproduction characteristics were obtained.

In this example, a recording method has been described on the assumption that a disk has magnetic layers 3 and 5 having no compensation temperature in a temperature range of room temperature or more and the Curie temperature or less. When a disk having a magnetic recording layer having a compensation temperature within the above range is used, the relationship between the direction of the bias magnetic field and the direction of magnetization of the disk may be appropriately changed.

A medium capable of performing an overwrite operation by optical modulation, in which magnetic layers 4 and 5 are not formed and magnetic layer 3 is initialized by an external magnetic field, may be used.

The present invention is not limited to the illustrated media and recording methods. The present invention is applicable if a medium is capable of recording in the heat mode.

As has been described above, according to a thermal recording medium and a recording method for this medium of the present invention, even if slight variations are present in a temperature distribution induced on a recording layer upon heating, recording marks having an almost predetermined vertical dimension (width) can be formed without recording compensation using laser driving. Therefore, a good reproduced signal can be advantageously obtained. In particular, when mark edge recording is performed, the jitter of an edge signal to be detected can be suppressed, thereby advantageously performing high-density recording.

Since no special compensation mechanism is required, a thermal recording medium and a recording apparatus which are capable of obtaining a good reproduced signal and performing high-density recording can be provided at low cost.

What is claimed is:

1. A thermal recording medium comprising:

a recording or erasing region which undergoes a change in state upon heating, wherein said recording or erasing region is formed in a substantially band shape elongated in a recording direction; and a plurality of helical or concentric tracks, wherein the width of said region in a direction perpendicular to the recording direction is smaller than the width of each of said plurality of tracks in the direction perpendicular to the recording direction.

2. A medium according to claim 1, wherein said thermal recording medium is a magnetooptical recording medium.

3. A recording method for a thermal recording medium, in which a local region of a recording film is heated to a predetermined temperature to reversibly change a state of the local region between two states, thereby recording or erasing information, comprising:

the initialization step of initializing said recording film in one of the two states;

the erasing step of forming a band-like region elongated in a recording direction on said recording film when said recording film is set in the other of the two states upon continuous or intermittent heating; and the recording step of heating said local region of said recording film to a predetermined temperature in accordance with information so as to include said band-like region in said local region to be heated and setting a state of the heated local region to be identical to the state of the initialization step.

* * * * *

UNITED STATES PATENT AND TRADEMARK OFFICE
CERTIFICATE OF CORRECTION

PATENT NO. : 5,648,134
DATED : July 15, 1997
INVENTOR(S) : SHIRATORI, ET AL.

It is certified that error appears in the above-identified patent and that said Letters Patent is hereby corrected as shown below:

Title page,
ABSTRACT
item [57]
    Line 2, "such" should read --in such--.

SHEET 3
    Figure 4, "ERARING" should read --ERASING--.

COLUMN 7
    Line 61, "on" should be deleted.

COLUMN 9
    Line 21, "hold" should read --hold,--.

Signed and Sealed this

Thirteenth Day of January, 1998

Attest:

BRUCE LEHMAN

Attesting Officer    Commissioner of Patents and Trademarks